Aug. 19, 1941.  T. R. WEBER  2,253,255
LAMINATED SPRING
Filed Sept. 14, 1940
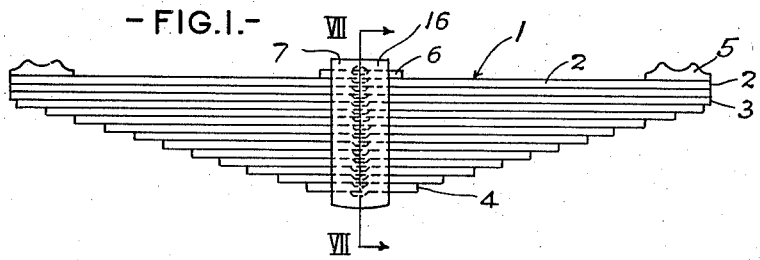
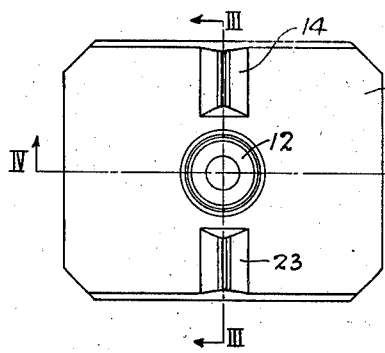 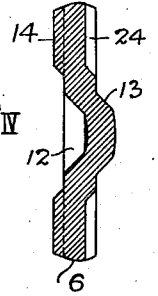 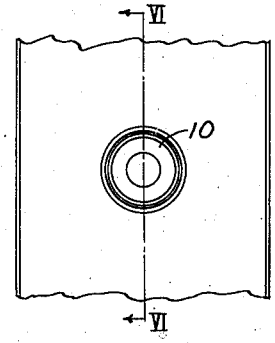
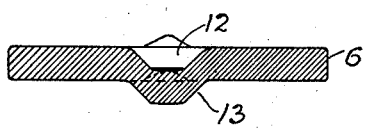 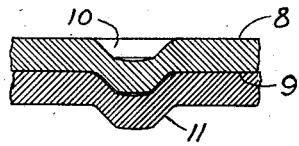
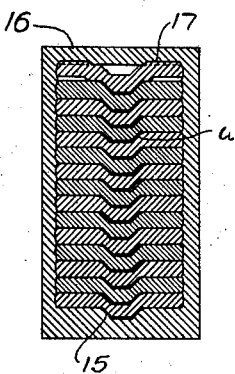 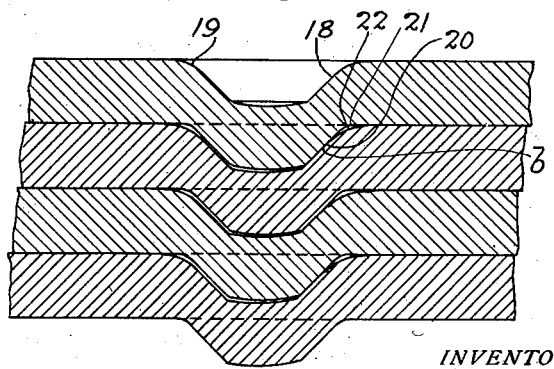
INVENTOR
Theodore R. Weber
BY
S. C. Eaton
ATTORNEY Patented Aug. 19, 1941

2,253,255

UNITED STATES PATENT OFFICE 2,253,255

LAMINATED SPRING

Theodore R. Weber, Latrobe, Pa., assignor to American Locomotive Company, New York, N. Y., a corporation of New York Application September 14, 1940, Serial No. 356,795

3 Claims. (Cl. 267—53)

This invention relates to plate or leaf springs of the elliptic and semi-elliptic types and more particularly to means for holding the plates of a spring against substantial bodily movement relative to each other and to the spring band.

An object of the present invention is to provide means for holding the plates of the spring against substantial bodily movement relative to each other, the means being characterized by being free from damage when subjected to shearing forces, free from a tendency to wedge and thereby force the plates apart, and free from transmitting forces to the tension face of a spring plate in such a manner as to fracture it.

A further object is to provide a coupling plate having means for holding an outermost spring plate of the spring against substantial bodily movement relative to the spring band, the holding means of the coupling plate having the aforementioned characteristics.

Other and further objects of and advantages achieved by the invention will be apparent from the following description of an approved embodiment thereof.

Referring to the drawing forming part of this application, Figure 1 is a side elevation of a semi-elliptic spring embodying the present invention; Fig. 2 is an enlarged plan view of the coupling plate shown in Fig. 1; Fig. 3 is a section on the line III—III of Fig. 2; Fig. 4 is a section on the line IV—IV of Fig. 2; Fig. 5 is an enlarged fragmental plan view of the center portion of the spring, the spring band and coupling plate being removed; Fig. 6 is a section on the line VI—VI of Fig. 5, only two plates being shown; Fig. 7 is an enlarged section on the line VII—VII of Fig. 1; and Fig. 8 is an enlarged fragmental longitudinal central section through the center portion of four adjacent spring plates showing the plates moved longitudinally relative to each other as under a force exerted longitudinally of the spring.

The laminated spring embodying the present invention is indicated generally by the reference numeral 1. For the purpose of illustration the spring and all the separate parts thereof, will be described in the position shown in Fig. 1 wherein one of the longest spring plates is at the top and the shortest spring plate is at the bottom. The spring includes an outermost elongated main spring plate 2, intermediate elongated spring plates 3, an outermost bottom elongated spring plate 4, the plate 4 and a number of the plates 3 being stepped in the usual manner, spring end clips 5 disposed at the ends of the main plate 2 in the usual manner, a coupling plate 6 disposed on top of the main plate 2 at the center portion thereof, and a closed spring band 7 encompassing all of the plates of the spring and holding them tightly together. Each of the spring plates has a top or tension face 8 and a bottom or compression face 9, the faces being placeable under tension and compression respectively, when the spring flexes in one direction (downward at its ends).

When each spring plate is formed, before its assemblage in the spring as a whole, a recess or depression 10 is pressed in the outer or tension face at the center portion thereof, this pressing forming a projection 11 extending from the inner or compression face, the depression and projection being aligned and having a common center. Similarly when the coupling plate 6 is formed it has pressed therein a depression 12 and a projection 13 similar respectively to the aforementioned depression 10 and projection 11, and further elongated lugs 14 pressed outwardly of the top face of the coupling plate, one on each side of the depression 12 and in transverse alignment therewith. When the band 7 is formed, before its assemblage in the spring as a whole, it is rectangular in shape and a depression 15 is pressed in the lower wall of the band similar to the depressions 10 and 12. Adjacent pairs of projections and depressions form coacting parts for interlocking their respective plates, or plate and spring band, together.

The spring is built up of its separate parts as follows: The spring plates are assembled with the plate 4 at the bottom, the plate 2 at the top, and the intermediate plates therebetween, in the usual manner, the projections of the main and intermediate plates each being centrally disposed in the depression of the adjacent plates therebeneath. Clamping means (not shown) is then applied to the spring plates, tightly pressing them together. The coupling plate is then superposed on the main plate with the projection 13 disposed centrally in the depression of the main plate. The band is heated and is then slipped over the ends of the plates at one end of the spring until it is disposed transversely over the center portions of the plates with the projection 11 of the plate 4 disposed centrally in band depression 15, the spring band being sufficiently large when heated to permit this and to encompass all of the plates of the spring. Means (not shown) is applied to the spring band pressing it tightly against the plates of the spring on the four sides thereof. This pressing forces the lugs 14 for their full depth into the hot metal of the top wall 16 of the band, thereby forming two grooves 17 complementary to the lugs 14. The spring band is cooled and thereby shrunk, whereupon it holds the superposed plates of the spring in tight engagement one with another at adjacent faces thereof and with the adjacent walls of the spring band. If desired, a spring band without the preformed depression 15 may be employed, the depression 15 being formed during the pressing of the hot band on the plates of the spring similarly to the formation of the grooves 17.

It has been found in known springs of this general type employing nib plate-locking means, that there is a tendency to longitudinal movement or slippage between the plates of the spring relative to each other and relative to the band when under thrust influence in a longitudinal direction. This slippage occurs mainly due to forces transmitted longitudinally through the spring during service conditions. Such longitudinal forces have previously damaged the conventional spring in several ways, namely by shearing off the nib projections, wedging the spring plates apart due to wedge-forcing the nibs out of their sockets, and consequently loosening the band, and causing fracture of a spring plate beginning at the jointure of a longitudinally spaced end face of the depression therein with the tension face thereof. The purpose of the present invention is directed to eliminating these damaging features in a spring of the aforedescribed type.

Each of the interfitting depressions and projections of the plates of spring 1 is frusto-conical in shape, the angle of inclination of the side wall of the cone being substantially 45 degrees. This provides for each depression, in effect, opposite transversely extending end faces 18 disposed longitudinally of the spring, each of these end faces being inclined at an angle of 45 degrees and converging toward each other, the base of this hollow cone being at the top (tension) face of its respective plate. While these end faces are arcuate they serve in effect as aforesaid as transversely extending end faces in that longitudinal forces are applied to them as if they were straight instead of arcuate. Each transverse end face of the depression is connected to the top face of its respective plate by a curved portion 19.

Each projection has transversely extending end faces 20, each corresponding to an adjacent end face 18 of the depression in which the projection is disposed.

It has been previously stated that the projections are disposed centrally of their depressions. To provide for this the projections are made slightly smaller than their engaging depressions both as to depth and circumference, producing thereby a slight clearance between a projection and its engaged depression. This clearance is preferably negligible, being only sufficient to prevent binding and to insure face to face contact of the adjacent plates. This clearance, indicated by the reference letter a in the figures, may be omitted where it is possible to form the projections and depressions so accurately that there is no danger of the projection holding its respective plate bottom face away from the top face of the adjacent plate immediately thereabeneath. That is to say, the clearance a is merely a tolerance. Each transverse end face 20 of the projection is connected to the bottom face of its respective plate by a curved portion 21. The curve of portion 21 has a shorter radius than the curve of portion 19, thereby providing a space 22 between the curved portions for a purpose later to appear. The portions 19 and 21 merge into the faces which they connect, and while they have been referred to in connection with the transverse faces 18 and 20 respectively, wherein lies the main feature of the invention, each nevertheless, as is obvious, extends, in the illustrated embodiment of the invention, entirely around the conical base from which it projects. When a force is applied to the spring longitudinally thereof so that the plates tend to move relative to each other, or to the spring band, the forces are transmitted through the projections and depressions. Thus, when the force or thrust is in a longitudinal direction, one end face 20 of a projection will be forced into tight engagement substantially throughout its height with its respective depression end face 18 substantially throughout its height, whereas the other end face 20 of the same projection will tend to move away from its adjacent depression end face 18. This condition is shown in Fig. 8 wherein the degree of movement is exaggerated for the purpose of illustration. In the instant illustration of Fig. 8, the thrust or force may be assumed as having been applied from the left upon the uppermost plate, and each of the plates of the stack has under this force been moved toward the right. Fig. 8 also illustrates the condition where the thrust is from the right and applied to the bottommost plate, the plates thereby moving toward the left. In either case it will be noted that the inclined faces at the right are in contact throughout their entire heights.

In conventional springs where the projection end face has a substantially greater angle of inclination than 45 degrees (i. e., more nearly vertical), such longitudinal forces tend to shear off the projection. In the instant spring the projection end face angle of substantially 45 degrees chosen is of sufficiently low inclination to prevent shearing off of the projection. In conventional springs where the angle of inclination of the projection end faces is substantially less than 45 degrees, this relative longitudinal movement tends to wedge the plates apart thereby stretching the spring band and loosening the plates if not resulting in actual disassemblage of the plates of the spring. In the instant spring the projection end face angle of substantially 45 degrees is of sufficiently high inclination to prevent this wedging.

In conventional springs, during the aforesaid relative longitudinal movement, the projection engages the depression at the jointure of the depression end face with the upper (tension) face of its respective plate. In the case of the depressions in the spring plates, this engagement results in damaging the spring plates. It is well known that the tension face of a spring plate is subject to the greatest stresses during flexing of the spring plate and that fractures are more likely to start in this face than elsewhere in the plate. Therefore in the conventional spring, fractures start at the jointure of the depression end face with its respective spring plate tension face due to the fact that forces being transmitted longitudinally through the spring are applied at this point, due to the engagement between the projection and depression at this point. In the instant spring the space 22 prevents the application of force at this point, the projection end face engaging the depression end face substantially throughout along a portion indicated by the letter b (Fig. 8). This engagement portion is near the neutral axis of the spring plate and therefore as this is a portion of the spring plate where stresses are not severe no damage occurs.

The lugs 14 of the coupling plate have transverse inclined walls 23. The inclination of these walls is sufficiently low to prevent the aforementioned longitudinal forces from shearing off the lugs. These lugs, as aforementioned, are pressed outward of the body portion of the coupling plate thereby leaving recesses 24 in the bottom or inner face of the coupling plate. The lugs stiffen the coupling plate transversely adjacent its depression and as they extend from the longitudinal edges of the plate substantially to the projection 13 they transmit the binding pressure of the spring band to the projection which aids the band in holding the plates of the spring tightly together. While the coupling plate is described as being of pressed steel construction it is obvious that it may be cast, if desired, the depression 12 and recesses 24 being eliminated as they have no function in the instant spring.

The aforegoing description has been made in connection with the semi-elliptic spring of the type shown in Fig. 1 wherein the projection extends from the bottom face of the spring plates and coupling plate. However the projection may, if desired, project from the upper face and the depression be formed in the bottom face. All of the advantages aforedescribed would be present if this modification were employed.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A semi-elliptic leaf spring comprising a group of superposed leaves; and a band tightly holding the leaves together, a face of one of said leaves having a recess in line with said band and the engaging face of the adjacent leaf having a projection extending into said recess; said recess and said projection each providing two opposed end faces spaced from each other in a direction longitudinally of said spring, diverging toward, and terminating in curves merging in, their leaf face, the angle of inclination of each said end face being substantially forty-five degrees, a recess end face beyond its curve being engageable with an adjacent projection end face beyond its curve when longitudinally directed force is applied to one of said adjacent leaves, said recess merging curve being of larger radius than said projection merging curve providing, during said engagement of said end faces, a space between said curves whereby harmful effects upon said recessed leaf, due to said force, when said recessed leaf is flexed to place its said face under tension, are minimized.

2. A semi-elliptic leaf spring comprising a group of superposed leaves; and a band tightly holding the leaves together, a face of one of said leaves being provided with a recess having a substantially frusto-conical face in line with said band and the engaging face of the adjacent leaf being provided with a projection having a substantially frusto-conical face extending into said recess, said recess and projection faces each diverging toward, and terminating in curves merging in, its leaf face, the angle of inclination of each said frusto-conical face being substantially forty-five degrees, said recess face at a part thereof beyond its curve being engageable with said projection face at an adjacent part thereof beyond its curve when longitudinally directed force is applied to one of said adjacent leaves, said recess merging curve being of larger radius than said projection merging curve providing, during said engagement of said recess and projection faces, a space between said curves whereby harmful effects upon said recessed leaf, due to said force, when said recessed leaf is flexed to place its said face under tension, are minimized.

3. A semi-elliptic leaf spring comprising a group of superposed leaves; and a band tightly holding the leaves together, a tension face of one of said leaves having a recess in line with said band and the engaging compression face of the adjacent leaf having a projection extending into said recess, said recess and said projection each having a defining face, each defining face providing two portions spaced from each other in a direction longitudinally of said spring, diverging toward, and being connected by curved portions to, their leaf face, the angle of inclination of each said diverging portion being substantially forty-five degrees, said recess face diverging portions being disposed in a part of said recessed leaf subject to bending stresses of less magnitude than said tension face when said spring is deflected to place said tension face under tension, a recess face diverging portion being engageable with an adjacent projection face diverging portion when longitudinally directed force is applied to one of said adjacent leaves, each said recess curved portion being of larger radius than the adjacent said projection curved portion providing, during said engagement of said diverging portions, a space between the curved portions adjacent thereto, whereby said longitudinally directed force is transmitted from one of said adjacent leaves to the other through a portion of said recessed leaf subject to bending tension stresses of less magnitude than said tension face, thereby minimizing harmful effects upon said recessed leaf due to said force when said recessed leaf is deflected to place its tension face under tension.

THEODORE R. WEBER.